July 30, 1929.  T. N. HOLDEN, JR  1,722,748
DENTAL MIRROR
Filed April 21, 1927
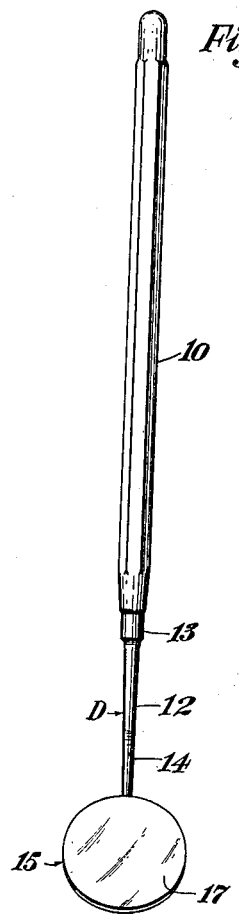
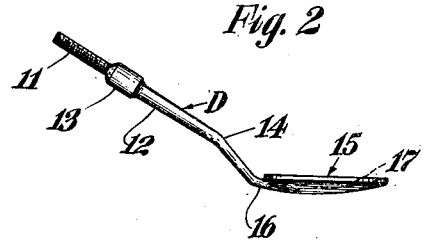
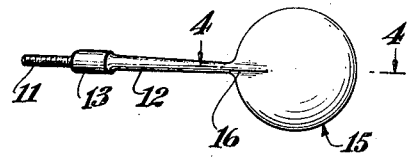
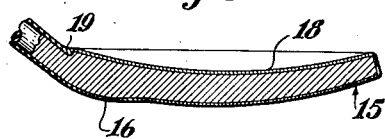
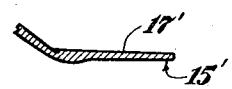
INVENTOR
Timothy N. Holden, Jr.,
BY Gustav Drews
ATTORNEY Patented July 30, 1929.

1,722,748

UNITED STATES PATENT OFFICE.

TIMOTHY N. HOLDEN, JR., OF BROOKLYN, NEW YORK.

DENTAL MIRROR.

Application filed April 21, 1927. Serial No. 185,414.

This invention relates to mirrors in general and more especially to dental mirrors.

Among the objects of the invention it is aimed to provide a mirror that may be used with perfect safety in dentistry where access to the regions to be examined is beset with difficulty, where the splints from glass is case of fracture might cause great expense and injury, and where sanitation is an essential attribute.

It has frequently been found in the dental profession, that the glass mirrors, now in use when coming in contact with tools, such as dentist's drills and the like, especially with nervous patients, would be chipped and fractured, causing splints to fly into the mouth of the patient resulting in injury. With such mirrors, supporting frames are required for the glass having the usual rim and the crevices formed thereby. The cleaning of these mirrors, so that the minute foreign matter collecting in the crevices is effectively removed, has been beset with considerable difficulty. The medicines and acids used in the dental profession and the vapors therefrom coming in contact with the mirrors when in use, frequently seep under the mirror reacting with the silver or other reflecting surface of the mirror to impair, if not entirely to destroy, its reflective quality. It has also been found that on account of the poor conductivity of glass, particularly in winter at low temperatures, the vapors collecting on the glass mirrors can only be removed with difficulty, unless the mirror's surface has been previously coated with some anti-vapor collecting substance such as anti-vim. On the other hand, when such substance is applied to the surface, we frequently meet with the further difficulty that this substance reacts with the vapors formed by the various medicines to produce disastrous and injurious results. Furthermore, after using a mirror so coated, on one patient, it naturally must be cleaned before using on another patient and the surface of the mirror again coated.

In the average dentist's office where such dental mirrors are used, nitric acid, sulphuric acid and all manner of organic acids are constantly present, and consequently if the mirror consists of the ordinary glass portion having a silvered surface, or consists of some other composition or metal that reacts with such acids, the reflecting surface would be in constant danger of being impaired.

In view of the foregoing objections presented by the glass mirrors now in use in the dental profession, it is a particular aim of the present invention to provide a mirror that will effectively overcome all of these defects.

Specifically, the invention contemplates the formation of a dental mirror from a one-piece metal stamping comprising a shank and mirror disk, plating such stamping with chromium, and forming a highly reflective surface on the mirror disk. This one-piece stamping comprehends a mirror that is durable, more resistant to fracture than glass when coming in contact with dentist's tools such as drills and the like, and the chips of which are less liable to cause irritation; a mirror that is immune to oxidation, to reaction with the ordinary dentist's medicines, to reaction with nitric acid, sulphuric acid and all organic acids such as is used in the dental profession; a one-piece shank and mirror disk free of any inaccessible crevices in which minute foreign particles might lodge; and a mirror having a coating such as chromium, which is a good conductor of heat so as to quickly dissipate any vapor that might form on the reflecting surface.

These and other features, capabilities and advantages of the invention will be apparent from a detailed description of the embodiment thereof illustrated in the accompanying drawings in which Figure 1 is a side elevation of one embodiment of the present dental mirror having a concave mirror surface, and a handle attached thereto;

Fig. 2 is an end elevation of the same with the handle removed;

Fig. 3 is a bottom plan view of the same with the handle removed;

Fig. 4 is an enlarged end elevation of the same with the handle removed and showing the mirror portion in section;

Fig. 5 is an end elevation of another embodiment having a plane mirror surface with the mirror portion in section.

In the embodiment illustrated in Figs. 1, 2, 3 and 4, there is shown a dental mirror having the usual handle portion 10 of polygonal cross section, the lower end of which is internally threaded to receive the threaded end 11 of the device D preferably composed of one piece and consisting of a shank and mirror disk. The one-piece device D consists of a shank 12 enlarged at 13 and terminating in the diminished screw threaded portion 11, and is bent downwardly at 14 merging into the disk portion 15, the lower surface of the disk portion 15 being enlarged at 16 where the shank portion 14 merges into the disk portion 15, thereby strengthening the joint formed between the shank portion 14 and the disk portion 15. In this embodiment the upper surface 17 of the disk portion 15 is concaved.

The embodiment illustrated in Fig. 5 is substantially identical to that illustrated in Figs. 1 to 4, with the exception that the upper surface 17' of the disk portion 15' is plane instead of concave.

This one-piece shank and mirror disk is preferably stamped out of brass or steel and is then plated by a substance such as chromium forming the coating 18 illustrated in Fig. 4. Experiments have been conducted with stainless steel and it has been found that the average dies and tools used in stamping out stainless steel devices of this character will be destroyed after a short time, making it impractical to die stamp these devices out of stainless steel. On the other hand, when these devices are made of brass or even tool steel, the cutting dies and tools used in die stamping these devices will stand up without difficulty. It will be seen that whatever sharp angles or recesses were formed during the stamping action and not removed before plating are thereupon completely covered and formed into continuous, uninterrupted rounded surfaces, see for instance the rounded surface at 19 formed by the chromium plate as distinguished from the sharp recess formed during the stamping action. By so plating the entire one-piece shank and mirror portion, the entire device that is extended into the mouth of the patient can be removed from the handle 10 and dipped into the disinfectant, whereby the entire surface of the shank and disk portion is readily accessible to the action of the disinfectant. Furthermore, after this device has been removed from the disinfectant bath, the same can be effectively dried, and all disinfectant removed therefrom.

The device so formed is thus absolutely insured against the unintentional retention of any foreign matter lodged in inaccessible recesses or depressions, or the retention of any disinfectant, particularly as distinguished from a dental mirror having a glass mirror portion attached to a metal support. With such glass mirrors, it has been found impossible absolutely to remove all foreign matter from the fine recess marking the division between the glass portion and the metal support, and furthermore, sooner or later, some of the disinfectant would be found to have seeped behind the glass portion between the metal support and the glass portion, and gradually to have impaired and destroyed the reflecting surface.

One of the objects of the present invention is to provide a coating for such one-piece shank and disk portion that is resistant to the ordinary chemicals used in a dentist's office, and at the same time is highly reflective. It has been found that a coating formed by chromium plating meets these requirements. A chromium plated surface, such as the surface 18, forms a highly reflective surface and at the same time constitutes a good conductor of heat in order quickly to dissipate any vapor that might form upon the reflective surface. Furthermore, on account of its resistance to oxidation, to all organic acids, and particularly to nitric acid or sulphuric acid, and to all the ordinary medicines used in the dentist's profession, it can be conveniently used in the dentist's office without constantly protecting the same against injury.

Furthermore, on account of the great resistance to fracture of such chromium plated stamping, the danger of flying splints so constant with the ordinary glass dental mirror is absolutely eliminated. Aside from the foregoing, as distinguished from stainless steel, the chromium plated coating here used has a hardness rated at nine in comparison with a diamond, while stainless steel is rated at not more than five. In this connection, it is to be noted that this characteristic of a chromium plated coating is of particular value when used as the reflecting surface of a dental mirror since it is the custom for dentists to wipe their mirrors with a towel and such dentists' towels have sufficient abrasive particles associated therewith as a rule, to cause scratches and the like to be produced on the average surface such as glass, stainless steel and the like. A chromium plated coating, on the other hand, is sufficiently hard to resist the abrasive particles of such dentists' towels and will remain unimpaired.

Furthermore, a chromium plated coating, as distinguished from stainless steel, does not require polishing but will retain its characteristic lustre indefinitely. Stainless steel, on the other hand, when soiled at all will, as a rule, require buffing to bring back its lustre. It is believed that this is due to the fact that a stainless steel surface is decidedly porous as compared to a chromium plated coating and consequently will readily grip soiled particles and the like, which soiled particles when accumulated will be sufficient to destroy or at least impair the reflecting efficiency of the reflecting surface of stainless steel and will so tenaciously grip such foreign matter as to resist removal when wiped with ordinary towels or the like. On the other hand, if sufficient force is exercised when so wiping the stainless steel surface, it may remove the foreign material but at the same time also mar the reflecting surface by producing scratches and the like.

The fact, as aforesaid, that a chromium plated coating has a low co-efficient of friction, is extremely smooth and free from pores as compared to the surface of stainless steel, is of particular value when such coating is used with a dental mirror since it will facilitate the ready removal of dirt, germs and foreign material and at the same time make it more difficult for such foreign material to collect.

It is obvious that various changes and modifications may be made to the details of construction without departing from the general spirit of the invention as set forth in the appended claim.

I claim:

In a dental mirror, a one piece device embodying a mirror portion and a shank portion and formed from readily malleable metal, said shank having an enlarged portion terminating in a reduced screw threaded portion for attachment to a handle, the shank being bent intermediate its ends merging at the end opposite the screw threaded portion into the mirror portion, said mirror portion forming a disk, the lower surface of which is enlarged at the point of merger of the shank into the mirror thereby strengthening the joint formed between the shank and disk portions, said one piece device being plated throughout with a chromium plating whereby the entire device may be immersed in antiseptic liquids without corrosion and without the establishment of an electrolytic couple.

TIMOTHY N. HOLDEN, JR.